May 26, 1959  K. E. GURITZ  2,888,511
ELECTRIC CORD
Filed June 20, 1955
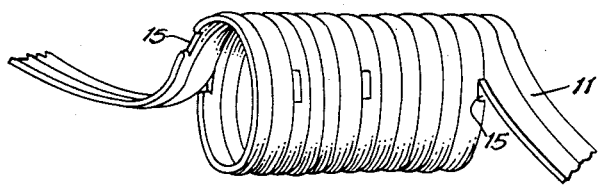
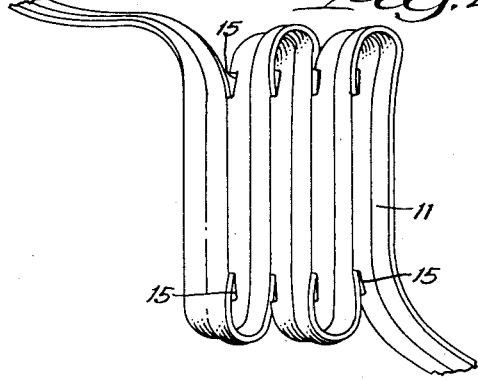
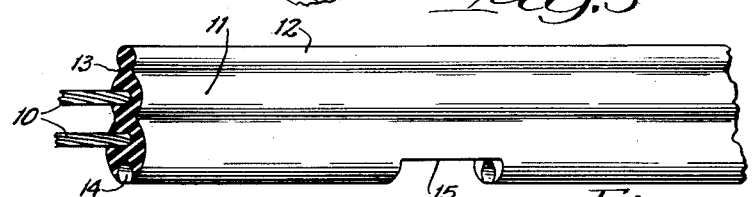
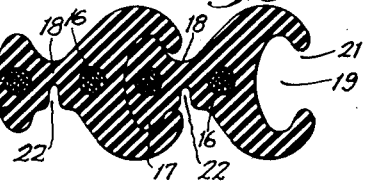
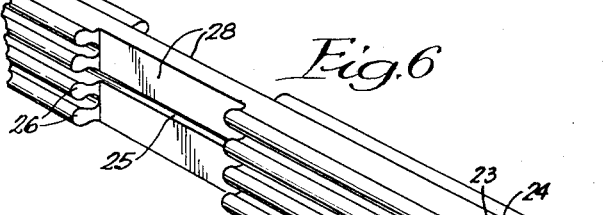
INVENTOR:
Kenneth E. Guritz,
BY
ATTORNEYS.

United States Patent Office 2,888,511
Patented May 26, 1959

2,888,511

ELECTRIC CORD

Kenneth E. Guritz, Geneva, Ill.

Application June 20, 1955, Serial No. 516,717

6 Claims. (Cl. 174—117)

This invention relates to an electric cord and more particularly to a cord for domestic use such as a lamp cord or the like or for wiring harnesses.

There are many locations in homes, offices and the like, in which cords for various electrical devices, such as lamps, clocks, radios, appliances, and the like, are too long and in which it is not desired to cut off the cord either because of the trouble and work involved, or because the device may be moved to a different location requiring a longer cord. The result is that cords may lie on the floor in a tangled mass which is unsightly and which may present elements of danger.

It has been proposed to use separate devices of different kinds on which excess cord can temporarily be wound to get it out of the way. Such devices not only involve elements of cost but are apt to be forgotten and lost and are inconvenient to use.

In making wiring harnesses it has been necessary to assemble the separate wires and bind them together with tape or insert them in a sheath. This is a time consuming operation and does not lend itself to correction of any mistakes.

It is therefore one of the objects of the present invention to provide an electric cord which can be coiled or folded upon itself and which is formed to retain itself securely in coiled or folded condition.

Another object is to provide an electric cord formed with a projecting bead at one side and a groove at the other side to receive and grip the bead to hold the cord secured in folded or coiled condition or to secure separate cords together.

According to one feature of the invention, the groove is cut away at spaced points in the length of the cord to facilitate fitting the bead into the groove and to enable folding of the cord into flat parallel folds.

According to another feature, one of the conductors of a twin conductor cord may be embedded in the bead.

The above and other objects and features of the invention will be more readily apparent from the following description when read in connection with the accompanying drawing, in which:

Figure 1 is a perspective view of a cord embodying the invention in coiled condition;

Figure 2 is a similar view showing the cord in flat folded condition;

Figure 3 is a partial perspective view of a cord embodying the invention;

Figure 4 is a section of cord of Figure 3 showing contiguous lengths of cord connected together;

Figure 5 is a view similar to Figure 4 of an alternative construction;

Figure 6 is a perspective view of a length of cord of an alternative construction; and Figure 7 is a sectional view of a single conductor cord for wiring harnesses or the like.

The cord as shown in Figures 1 to 4 comprises a pair of conductors 10 which may be the usual twisted copper wire and which are embedded in spaced parallel position in a body of insulating material, such as plastic. The plastic insulating material, indicated generally at 11, may be extruded around the conductors so that it can easily be given any desired cross-sectional shape.

As best seen in Figure 4, the plastic material 11 has a generally hour-glass contour with the conductors 10 embedded in the larger portions of each glass section. Along one edge of the relatively flat plastic body there is formed an integral bead 12 which may have any desired section, but which is thinner immediately adjacent to the plastic sheath than it is remote from the plastic sheath.

As shown, the bead 12 is partially circular in section and is connected to the main body of the plastic sheath through a relatively thin neck portion 13. At its opposite edge, the plastic sheath is formed with a groove 14 which is complementary in section to the bead 12. The groove 14, as shown, is partially circular in section and opens to the outer edge portion of the sheath through a relatively narrow slit of a width approximately equal to the thickness of the neck portion 13.

To facilitate putting the cord together, the grooved edge of the sheath is cut away periodically to leave openings, as shown at 15. These openings enable the bead to be inserted easily in the groove and provide points at which the bead can extend from the groove without pulling out. The openings 15 are preferably provided at uniformly spaced points in the length of the tape and may be spaced at a distance of eight inches to a foot.

The cord is adapted to be coiled, as shown in Figure 1, in a form of a helical coil which will hold excess length of a cord neatly in a small compact bundle. For this purpose, the bead 12 at one edge of the cord may be pressed into the groove 14 at the opposite edge of the cord with the cord in coiled condition, as shown. The bead will leave the groove at the opposite ends of the coil through the openings 15 so that the coil can easily be stored and so that the bead will be securely held without pulling easily from the groove in the final coil. In this way, the coil can easily be made of any desired length to take up any desired excess length of cord.

Alternatively, the cord can be folded in a flat bundle, as shown in Figure 2. As there illustrated, the bead at one edge of the cord may be inserted in the groove at the opposite edge of the cord and may extend only from one opening 15 to the next adjacent opening 15. The cord may then be folded back on itself, as shown, in the form of a series of flat folds which are held together by gripping of the bead at one edge in the groove at the opposite edge to form a compact flat bundle which will present a neat appearance and which will hold the cord in a desired manner.

In the alternative construction shown in Figure 5, two parallel conductors 16 are provided which are covered by a plastic sheath similar to the sheath of Figures 1 to 4. In this case, one of the conductors is covered by a flattened bead portion 17 joined to the main body of the sheath through a thin neck 18 and the other conductor lies in the main body of the sheath. At the edge opposite to the bead 17 the sheath is extended to define a partially circular groove 19 opening at the outer edge of the sheath through a narrow slit 21. In placing two adjacent lengths of this cord together, the bead 17 at one edge of the cord is forced into the groove 19 at the opposite edge of the adjacent length of cord to hold the two lengths securely in side-by-side relationship. It will be understood that the groove portion 19 is cut away periodically, as at 15 in Figures 1 to 4, to facilitate coiling or folding of the cord in the same manner as with the construction of Figures 1 to 4. The neck 18 may be further grooved as shown at 22 to facilitate separation of the wires 16.

In the construction of Figure 6 two conductors 23 are embedded in identically shaped plastic sheaths 24 which are connected by a thin neck portion 25 so that the wires can be separated easily. Each of the sheaths 24 is formed on its opposite sides with a pair of spaced projecting beads 26 which are narrower adjacent the wire than remote therefrom and which define between them a groove 27 complementary in section to the beads.

To connect side-by-side lengths of the conductor of Figure 6, two of the beads 26 at one side of a length of the wire may be fitted into the groove 27 at the adjacent side of the other length of wire to secure the two lengths of wire together. In this case the wire is connected through two beads fitting into two complementary grooves so that the wire will be securely held. The beads 26 may be cut away periodically in the length of the conductor, as shown at 28 to facilitate connecting the lengths of wire together in the manner shown in Figures 1 and 2.

Figure 7 illustrates a single conductor member for use in wiring harnesses or the like. In this construction a single conductor 31 is embedded in a plastic sheath 32 which is formed at one side with a projecting oval bead 33 secured to the main body of the sheath through a reduced neck 34. The opposite side of the sheath is formed with an oval groove 35 complementary in shape to the bead 33 to receive and grip the bead 33. In assembling a wiring harness with a conductor of this construction, the several wires making up the harness may be connected together through the bead and groove construction without the use of any taping or separate sheaths. In the event it is desired to alter or repair the harness, the conductors can easily be separated without damaging any of them and can be reassembled with the same or other conductors in the desired harness structure. For wiring harnesses, the sheath could, if desired, have two projecting beads and two grooves at its four sides to facilitate a compact assembly.

While several embodiments of the invention have been shown and described herein, it will be understood that they are illustrative only and not to be taken as a definition of the scope of the invention, reference being had for this purpose to the appended claims.

What is claimed is:

1. An electric cord comprising elongated conductor means, a sheath of flexible insulating material enclosing the conductor means, means defining a bead extending from one side of the sheath and of greater thickness remote from the sheath than closely adjacent thereto, and means defining a groove in another side of the sheath complementary to the bead to receive and grip the bead so that adjacent lengths of the cord can be secured together in side-by-side relationship, one of said means being cut away at spaced points in the length of the cord to facilitate insertion of the bead into the groove.

2. An electric cord comprising a pair of elongated conductors in spaced parallel relationship, a generally flat sheath of flexible insulating material enclosing the conductors, an integral bead extending from one edge of the sheath connected to the sheath through a web portion thinner than the bead, and spaced integral lips at the other edge of the sheath defining a groove complementary in section to the bead to receive and grip the bead, said lips being cut away at spaced points in the length of the cord to facilitate insertion of the bead into the groove.

3. The construction of claim 2 in which one of the conductors lies within the bead.

4. An electric cord comprising a pair of elongated conductors in spaced parallel relationship, a sheath of resilient insulating material enclosing the conductors, and a pair of integral beads projecting from opposite sides of the sheath, each of the beads being connected to the sheath through a lip portion thinner than the bead at a point remote from the sheath and the beads of each pair defining between them a groove complementary in section to a bead said beads on at least one side of the sheath being cut away at spaced points in the length of the cord.

5. An electric cord comprising a pair of elongated conductors in spaced parallel relationship, a sheath of insulating material formed with two enlarged sections enclosing the conductors respectively and joined by a narrow severable neck portion, and a pair of integral beads projecting from opposite sides of each of the enlarged sections, each of the beads being connected to the sheath through a lip portion thinner than the bead remote from the sheath and each pair of beads defining between them a groove complementary in section to a bead said beads on at least one side of the sheath being cut away at spaced points in the length of the cord.

6. An electric cord for use in wiring harnesses and the like comprising a single elongated conductor, a sheath of resilient insulating material enclosing the conductor, means defining a bead projecting from one side of the sheath and of greater thickness remote from the sheath than closely adjacent thereto, and means at the ohter side of the sheath defining a groove complementary in section to the bead one of said means being cut away at spaced points in the length of the cord.

References Cited in the file of this patent

UNITED STATES PATENTS

| | | |
|---|---|---|
| 1,802,302 | Zagorski | Apr. 21, 1931 |
| 1,959,318 | Sundback | May 15, 1934 |
| 2,528,667 | Raabe | Nov. 7, 1950 |